US011008217B2

(12) United States Patent
Lofberg et al.

(10) Patent No.: US 11,008,217 B2
(45) Date of Patent: May 18, 2021

(54) PLANT AND PROCESS FOR TREATING A STREAM COMPRISING HYDROGEN SULFIDE

(71) Applicants: Centre National de la Recherche Scientifique, Paris (FR); Université de Lille, Lille (FR)

(72) Inventors: Axel Lofberg, Lille (FR); Jesus Guerrero, Terassa (ES)

(73) Assignees: CENTRE NATIONAL DE LA RECHERCHE SCIENTIFIQUE, Paris (FR); UNIVERSITÉ DE LILLE, Lille (FR)

( * ) Notice: Subject to any disclaimer, the term of this patent is extended or adjusted under 35 U.S.C. 154(b) by 201 days.

(21) Appl. No.: 16/303,645

(22) PCT Filed: May 19, 2017

(86) PCT No.: PCT/EP2017/062172
§ 371 (c)(1),
(2) Date: Nov. 20, 2018

(87) PCT Pub. No.: WO2017/198851
PCT Pub. Date: Nov. 23, 2017

(65) Prior Publication Data
US 2020/0207622 A1   Jul. 2, 2020

(30) Foreign Application Priority Data
May 20, 2016   (FR) .................... 16 54563

(51) Int. Cl.
| | | |
|---|---|---|
| *C01B 17/04* | (2006.01) | |
| *B01J 4/00* | (2006.01) | |
| *B01J 8/24* | (2006.01) | |
| *B01J 23/22* | (2006.01) | |
| *B01J 38/12* | (2006.01) | |

(52) U.S. Cl.
CPC .......... *C01B 17/0447* (2013.01); *B01J 4/008* (2013.01); *B01J 8/24* (2013.01); *B01J 23/22* (2013.01); *B01J 38/12* (2013.01)

(58) Field of Classification Search
CPC ....... C01B 17/04; C01B 17/046; C10L 3/103; B01D 53/1468; B01D 53/52; B01D 53/81; B01D 53/82; B01D 53/83; B01D 53/96; B01D 2251/602; B01D 2253/1124; B01D 2257/304; B01D 2259/40083
See application file for complete search history.

(56) References Cited

U.S. PATENT DOCUMENTS

| | | | |
|---|---|---|---|
| 4,088,736 A | 5/1978 | Courty et al. | |
| 4,363,790 A * | 12/1982 | Anderson | ............... C01B 17/04 |
| | | | 423/230 |
| 4,478,800 A | 10/1984 | Van Der Wal et al. | |
| 5,271,907 A * | 12/1993 | Copeland | ............... B01D 53/08 |
| | | | 422/139 |
| 5,306,476 A * | 4/1994 | Jalan | .................... B01D 53/228 |
| | | | 423/220 |
| 5,653,953 A | 8/1997 | Li et al. | |
| 6,596,253 B1 | 7/2003 | Barrere-Tricca et al. | |
| 7,226,572 B1 | 6/2007 | Keller et al. | |
| 7,226,883 B1 | 6/2007 | Nagl et al. | |
| 2002/0059864 A1* | 5/2002 | Janssen | .................... B01J 20/06 |
| | | | 95/108 |
| 2005/0135983 A1 | 6/2005 | Geosits et al. | |
| 2016/0279595 A1* | 9/2016 | Tsapatsis | ........... B01J 20/28007 |

FOREIGN PATENT DOCUMENTS

| | | |
|---|---|---|
| EP | 0 071 983 | 12/1986 |
| WO | WO 02/058822 A1 | 8/2002 |
| WO | WO 2005/030638 A1 | 4/2005 |
| WO | WO 2012/057925 A1 | 5/2012 |
| WO | WO 2014/124011 A1 | 8/2014 |

OTHER PUBLICATIONS

Fang, et al. 2013 "Selective oxidation of hydrogen sulfide to sulfur over activated carbon-supported metal oxides" *Fuel* 108: 143-148.
Li; and Chi 2001 "Selective oxidation of hydrogen sulfide on rare earth orthovanadates and magnesium vanadates" *Applied Catalysis A: General* 206: 197-203.
Palma; and Barba 2014 "$H_2S$ purification from biogas by direct selective oxidation to sulfur on $V_2O_{5-CeO2}$ structured catalysts" *Fuel* 135: 99-104.
Palma; and Barba 2014 "Low temperature catalytic oxidation of $H_2S$ over $V_2O_{5/CeO2}$ catalysts" *International Journal of Hydrogen Energy* 39: 21524-21530.
Reyes-Carmona, et al. 2013 "Iron-containing SBA-15 as catalyst for partial oxidation of hydrogen sulfide" *Catalysis Today* 210: 117-123.
Soriano, et al. 2012 "Alkali-promoted $V_2O_5$ catalysts for the partial oxidation of $H_2S$ to Sulphur" *Catalysis Today* 192: 28-35.
Terörde, et al. 1993 "Selective oxidation of hydrogen sulfide to elemental sulfur using iron oxide catalysts on various supports" *Catalysis Today* 17: 217-224.

* cited by examiner

*Primary Examiner* — Timothy C Vanoy
(74) *Attorney, Agent, or Firm* — Knobbe, Martens, Olson & Bear, LLP

(57) ABSTRACT

The invention relates to an installation and a method for treating hydrogen sulphide. In particular, the invention relates to an installation and a method comprising at least one system for oxidizing hydrogen sulfide to sulfur (S) and water ($H_2O$) with a solid reagent and at least one oxidizing system with an agent for oxidizing the solid reagent present in the reduced state, wherein the system of oxidizing the hydrogen sulfide to sulfur and the system for oxidizing the solid reagent, are so arranged that the hydrogen sulfide is not brought into contact with the agent oxidizing the solid reagent.

26 Claims, 5 Drawing Sheets

PLANT AND PROCESS FOR TREATING A STREAM COMPRISING HYDROGEN SULFIDE

FIELD

The present invention relates to an installation and a method for treating hydrogen sulphide comprising at least one system for oxidizing hydrogen sulphide to sulfur (S) and water ($H_2O$).

BACKGROUND

Hydrogen sulphide ($H_2S$) is a by-product of industrial methods, particularly fossil hydrocarbon desulphurization methods such as refining and biogas production. It is toxic to humans and the environment and is a poison for most catalytic methods. Current methods for treating $H_2S$ involve prior separation of the other constituents of the effluents to be treated by adsorption or washing, and subsequent oxidation to sulfur (S) via a multi-stage method (the so-called "Claus" method). The selective oxidation of $H_2S$ to S by oxygen ($H_2S + \frac{1}{2} O_2 \rightarrow S + H_2O$) is an interesting alternative. These methods lead to the production of sulfur which is then upgraded, for example, to sulfuric acid or fertilizer. The drawbacks of these methods, however, are (i) the production of by-products such as $SO_2$ or $SO_3$ if the catalyst is not selective, (ii) to require $H_2S$—$O_2$ mixtures, which induce a loss of selectivity as well as limitations in concentration of the reagents due to their flammability or explosiveness. All existing methods involve operating conditions that are limited by the explosiveness of $H_2S$—$O_2$ mixtures. The reaction in excess of $H_2S$ is more favorable from the point of view of the selectivity but limited by the supply of oxygen, whereas the excess of oxygen leads to total oxidation.

The catalysts proposed for this reaction experience strong deactivations related to the deposition of sulfur on the surface of the catalysts or to their sulfurization.

The current methods all include a first phase of separation of hydrogen sulfide from the other components of the gas to be treated, either by the use of physical adsorbers or by washing in alkaline solutions. In a second step, the $H_2S$ is recovered by desorption or separation of the washing solutions. The $H_2S$ thus separated is then oxidized to produce solid sulfur (S) by the Claus method, which itself comprises several steps. The first, thermal, consists in partially oxidizing $H_2S$ to $SO_2$ at high temperature (>1000° C.), the second, catalytic, involves the reaction of $SO_2$ formed with $H_2S$ to produce S and $H_2O$.

At present the removal of the $H_2S$ from gaseous effluents requires prior separation by adsorption or washing and subsequent treatment via the Claus method.

In addition, the use of renewable energies is necessary to reduce greenhouse emissions, but hydrogen sulphide is produced in large quantities during the methanisation of biomass for biogas production. The development of these alternative resources therefore requires the development of efficient and inexpensive methods of elimination or even recovery of hydrogen sulphide.

To the inventors' knowledge, there has not yet been a proposal for a periodic type method with a solid oxygen vector for the selective and preferable oxidation of $H_2S$ (to S) (in the presence of other reagents like methane).

On the other hand, there have been several studies concerning the partial oxidation of hydrogen sulphide under close temperature and pressure conditions, but by co-feeding oxygen to oxidize the $H_2S$.

For example, the work of Palma et al. (Palma, D. Barba, *$H_2S$ purification from biogas by direct selective oxidation to sulfur on $V_2O_5$—$CeO_2$ structured catalysts*, Fuel 135 (2014) 99-104, http://dx.doi.org/10.1016/j.fuel.2014.06 V. Palma, D. Barba, *Low temperature catalytic oxidation of $H_2S$ over $V_2O_5$/$CeO_2$ catalysts*, Int J Hydrogen Energ 39 (2014), 21524-21530 http://dx.doi.org/10.1016/j.ijhydene.2014.09.120) propose a system employing a solid with vanadium as the active phase and cerium oxide as a support that also obtains about 100% conversion to $H_2S$ and with selectivity. Although they propose the use of their catalysts for the treatment of biogas with typical $H_2S$ concentrations (200 ppm), they do not mix reagents ($H_2S$ and $O_2$) with $CH_4$ and $CO_2$. Thus they do not check the reactivity of methane and carbon dioxide.

Soriano et al, (M. D. Soriano, J. M. Lopez Nieto, F. Ivars, P. Concepcion, E. Rodriguez-Castellon, *Alkali-promoted $V_2O_5$ catalysts for the partial oxidation of $H_2S$ to sulfur*, Catal Today 192 (2012) 28-35, doi: 10.1016/j.cattod.2012.02.016; A. Reyes-Carmona, M. D. Soriano, J. M. Lopez Nieto, D. J. Jones, J. Jimenez-Jimenez, A. Jimenez-Lopez, E. Rodriguez-Castellon, *Iron-containing SBA-15 as catalyst for partial oxidation of hydrogen sulfide*, Catal Today 210 (2013) 117-123, http://dx.doi.org/10.1016/j.cattod.2012.11.016) propose a similar study with, this time, higher initial $H_2S$ concentrations (1200 ppm) and a higher reaction temperature (200° C.). These studies use a mixture with a specific ratio of hydrogen sulphide and oxygen but can not overcome the explosive limits of the hydrogen sulphide/oxygen mixture. It is difficult to obtain both a conversion and a selectivity around 100%.

SUMMARY

The invention aims to solve one or more, and preferably all, of the technical problems mentioned above.

More particularly, the invention aims to solve the technical problem of providing a method and an installation for oxidation of hydrogen sulfide that is highly selective to sulfur, and, in particular, maintains a high conversion of hydrogen sulfide.

The aim of the invention is to solve the technical problem of providing a method and an installation for the oxidation of hydrogen sulphide to a hydrogen sulphide concentration in the explosive range of a mixture comprising sulphide of hydrogen and dioxygen, i.e. that the flow comprising hydrogen sulphide, preferably in gaseous form, has a concentration of hydrogen sulphide whose stoichiometric conversion to sulfur and water requires a mixture comprising sulphide of hydrogen and oxygen in the field of explosiveness.

The object of the invention is to solve the technical problem of providing a method and an installation allowing low deactivation of the oxidation catalyst of the hydrogen sulphide.

The invention aims to solve this, or these, technical problem(s) in the context of a method and a facility for refining and/or production of biogas.

More particularly, the object of the invention is to solve the technical problem of providing an installation for the oxidation of hydrogen sulphide which is highly selective to sulfur, and, in particular, by maintaining a high conversion of hydrogen sulphide by limiting the oxidation of the other gases present, such as methane and/or carbon dioxide.

The invention relates to an installation or a method for treating hydrogen sulphide, wherein the installation or method comprises at least one system for oxidizing hydrogen sulphide to sulfur (S), preferably hydrogen sulphide wherein the sulfur is in gaseous form, and to water ($H_2O$) with a solid reagent, and at least one oxidation system with an oxidizing agent of the solid reagent present in the reduced state, wherein the system of oxidation of hydrogen sulphide to sulfur and the system of oxidation of the solid reagent is so arranged that the hydrogen sulfide is not brought into contact with the oxidizing agent, the solid reagent.

The invention also relates to an installation or a method for treating at least one flow comprising hydrogen sulphide, wherein the installation or the method comprising the alternation, preferably repeated, of an oxidation step of hydrogen sulphide to sulfur and water in the presence of a solid reagent present in the oxidized state, and reduced during the oxidation of the hydrogen sulphide, and an oxidation step of the solid reagent present in the reduced state by at least one oxidizing agent in order to obtain a solid reagent in the oxidized state, wherein the method comprises the obtaining of a flow comprising sulfur by oxidation of the hydrogen sulphide.

More particularly, according to one embodiment, the installation comprises a supply duct for a flow comprising hydrogen sulphide to a system for oxidizing hydrogen sulphide to sulfur and water and a discharge duct for a flow comprising sulfur.

According to a variant, the installation comprises, downstream of the system for oxidation of the hydrogen sulfide to sulfur in gaseous form, a device for separation of sulfur from the flow initially comprising sulfur, wherein the separation device is preferably a device for condensation of sulfur in liquid or solid form.

According to one embodiment, the installation comprises one or more devices (140, 340, 440) for switching between the inlet (111, 311, 318) of the hydrogen sulphide in the system (110, 310, 410) for oxidation of the hydrogen sulphide to sulfur and the inlet (113, 313, 418) of the agent oxidizing the solid reagent in the system (110, 310, 410) for oxidation of the solid reagent.

Typically, the hydrogen sulfide and/or the sulfur are/is in gaseous form.

Typically, the system for oxidizing the hydrogen sulphide to sulfur comprises a hydrogen sulphide oxidation reactor in the presence of a solid reagent that is present in the oxidized state. The solid reagent is typically reduced upon oxidation of the hydrogen sulfide.

According to a preferred embodiment, the system for oxidizing the solid reagent comprises a supply of at least one oxidizing agent, in particular an agent comprising oxygen, such as, for example, air, for example in gaseous form. The oxidizing agent is advantageously used for the oxidizing of the solid reagent present in the reduced state.

The term "oxygen" means the chemical element in all its forms. Molecular oxygen is referred to as "oxygen" or $O_2$ unless otherwise indicated.

According to one variant, the flow of oxidizing agent is supplied against the current of the flow comprising the solid reagent, if the solid reagent circulates within the reactor oxidizing the solid reagent.

According to one embodiment, the installation and the method of the invention comprise a loop for recycling the solid reagent, wherein the loop comprises an oxidation system of the solid reagent present in the reduced state in the presence of an oxidizing agent and a system for reducing the solid reagent present in the oxidized state, wherein the solid reagent reduction system also forms the hydrogen sulfide oxidizing system in the presence of a solid reagent present in the oxidized state.

According to one variant, a flow comprising the oxidizing agent leaving the reactor oxidizing the solid reagent is collected at a reduced concentration of oxidizing agent with respect to the concentration of oxidizing agent of the flow comprising the oxidizing agent entering the reactor oxidizing the solid reagent.

According to one variant, the flow comprising hydrogen sulphide comprises a hydrocarbon, for example methane and/or carbon monoxide and/or dioxide, optionally in the presence of an inert gas such as, for example, dinitrogen.

Preferably, the step of oxidizing the hydrogen sulphide is carried out in the absence of an agent for oxidizing the solid reagent, and, in particular, in the absence of oxygen.

Preferably, the oxidizing of hydrogen sulfide is carried out under conditions limiting the total oxidizing of hydrogen sulfide to sulfur oxide.

The present invention also relates to an installation and a methanization method implementing the installation and/or the method for treating $H_2S$ according to the invention.

The present invention also relates to an installation and a method for refining hydrocarbons implementing the installation and/or the method for treating $H_2S$ according to the invention, for example in petrochemistry.

The present invention further relates to an installation and a method for fluidized catalytic cracking or chemical loop combustion.

DETAILED DESCRIPTION OF THE INVENTION

Figure 1:
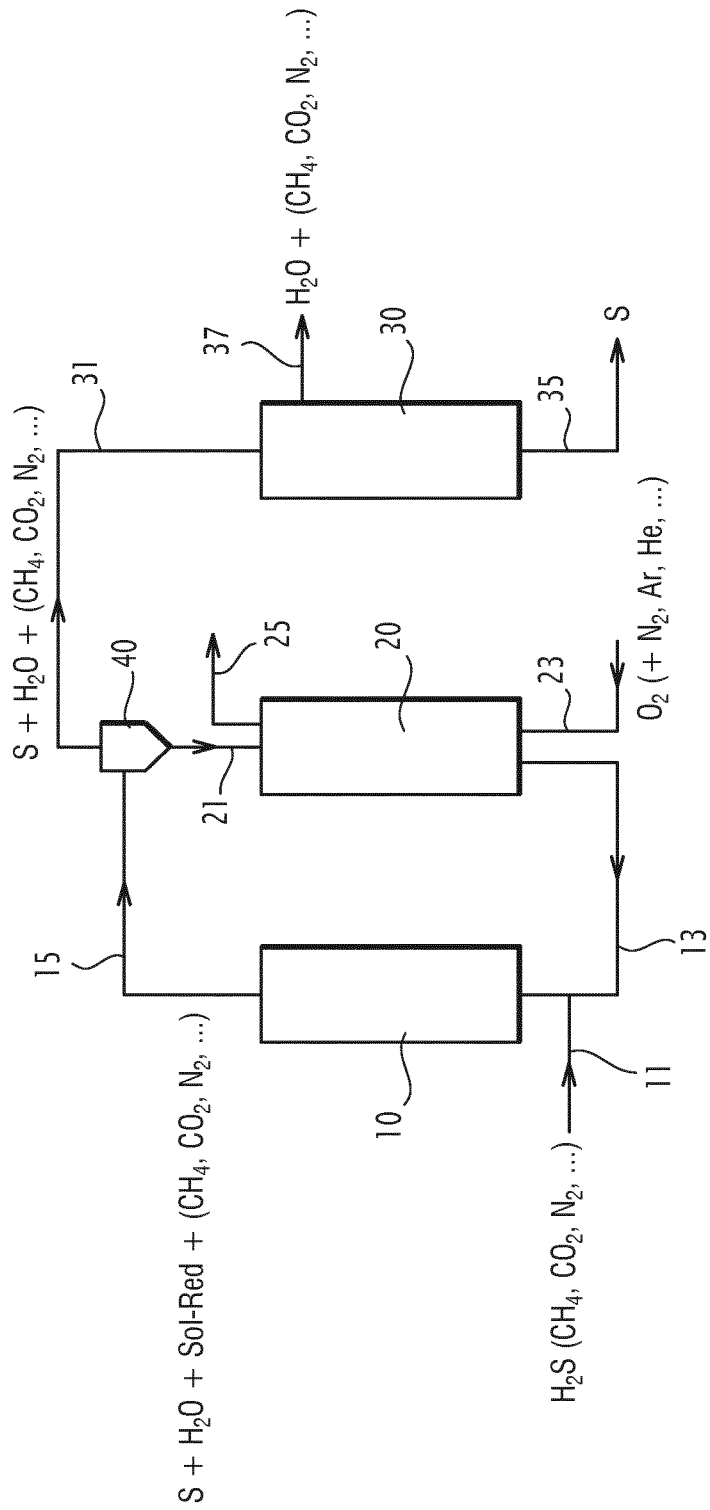
FIG. 1. Schematic diagram of a first variant installation and a flow scheme outlining a method of treating a flow comprising hydrogen sulfide.

The method of the invention preferably comprises a reactive or catalytic solid alternately exposed and preferably repeated to each of the selective oxidizing reagents ($H_2S$ and $O_2$) where it acts as an oxygen carrier. At first, the solid reacts with hydrogen sulphide to form sulfur and water, then it reacts with $O_2$ to recharge itself in oxygen. During this second phase, the sulfur optionally deposited during the first phase is re-oxidized by oxygen, which advantageously makes it possible to avoid the deactivation of the solid reagent by sulfur accumulation, if need be.

This method eliminates the main drawbacks described above, which make it possible in particular: (i) to obtain excellent selectivities, (ii) to remove any reagent concentration limitations in the absence of explosive mixtures, and (iii) to treat the flow of gas containing other reactive molecules such as hydrocarbons, such as methane, or carbon dioxide, without prior separation.

One of the main disadvantages of the prior art is the limitation of the reaction equilibrium:

$$2H_2S+SO_2 \rightarrow 3S+2H_2O \quad DH_{298}° \text{ K}=-234 \text{ Kj/mol} \quad (eq. 1)$$

On the contrary, the selective oxidizing of $H_2S$ is practically irreversible and has no thermodynamic limitation.

$$2H_2S+O_2 \rightarrow 2S+H_2O \quad DH_{298}° \text{ K}=-531 \text{ Kj/mol} \quad (eq. 2)$$

However, the sulfur yield depends on the performance of the catalysts, in particular to avoid the total oxidizing of $H_2S$ to $SO_2$ or $SO_3$:

$$2H_2S+3O_2 \rightarrow 2SO_2+2H_2O \quad DH_{298}° \text{ K}=-1124 \text{ Kj/mol} \quad (eq. 3)$$

$$S+O_2 \rightarrow SO_2 DH_{298}° \text{ K}=-297° \text{ Kj/mol} \quad (eq. 4)$$

$$2S+3O_2 \rightarrow 2SO_3 DH_{298}° \text{ K}=-882 \text{ Kj/mol} \quad (eq. 5)$$

The sulfur yield depends on the catalytic performance of the material (conversion, selectivity) as well as the operating conditions (reaction temperature and the $H_2S/O_2$ ratio).

In addition to the selectivity, it is also necessary to consider a probable deactivation of the catalyst because of the deposition of sulfur on the catalyst as well as the possibility of sulphidation of the metal or its oxide because it may also affect the stability of the catalyst.

In summary, the selective oxidizing of $H_2S$ (eq. 2) has the advantage of directly leading to the production of S without producing other problematic by-products ($SO_2/SO_3$, provided that a catalytic system is efficient and selective. However, it has the disadvantage according to the prior art of requiring $H_2S$—$O_2$ mixtures that may adversely affect the selectivity and/or limit the operating conditions in view of the flammability of the mixture.

The present invention relates to a method and an installation answering these technical problems.

Advantageously, the present invention relates to a method and an installation implementing the reaction $2H_2S+O_2 \rightarrow 2S+H_2O$ within one reactor or a combination of several reactors for oxidizing the hydrogen sulphide and the reduction of oxygen.

Advantageously, the present invention relates to a method and an installation implementing the $2H_2S+O_2 \rightarrow 2S+H_2O$ (eq. 6) reaction where sol-O and sol-R respectively symbolize constituents of the solid reagent in oxidized and reduced forms. The sulfur is then advantageously released in gaseous form.

Advantageously, the invention relates to a method in which the reactive (or catalytic) solid is alternately exposed and preferably repeated to each of the reagents for the oxidizing of $H_2S$ (hydrogen sulphide and oxygen). Advantageously, the solid reagent acts as an oxygen carrier. At first, the solid reacts with $H_2S$ to form sulfur and water. Then, it reacts with oxygen to recharge in oxygen.

The removal of hydrogen sulphide by selective oxidizing is not carried out according to the prior art because of the rapid deactivation of the catalysts and the low selectivity of sulfur due to the competition of different reactions. In addition, the operating conditions are generally limited by the explosiveness of $H_2S$—$O_2$ mixtures and are, therefore, not very suitable for the treatment of effluents that are highly concentrated in $H_2S$ as may result from desulfurization in petroleum refining or biogas. In all cases, according to the prior art, the $H_2S$ must be separated prior to the effluents by adsorption or washing which involves a multi-stage method and is highly energy-consuming and/or water-consuming.

Advantageously, with the method and the installation according to the invention, the total oxidizing reaction of the sulfur produced is avoided by the absence of oxygen during the oxidizing phase of the hydrogen sulphide. Advantageously, according to the invention, the oxygen participating in the oxidizing reaction of hydrogen sulphide to sulfur is provided by the solid reagent.

Advantageously, the selectivity in sulfur may therefore be greater than 95%, preferably greater than 99%, and may ideally reach 100%.

Advantageously, the deactivation of the solid reagent may be avoided by reoxidizing the solid reagent during the reaction phase with the oxidizing agent, typically oxygen.

The $H_2S$ concentration is not limited by the explosiveness of the $H_2S$—$O_2$ mixtures since these two reagents are never in contact.

The selective oxidizing of $H_2S$ may be performed in the presence of other molecules such as methane (and $CO_2$ in the case of biogas) without prior separation.

The method may be optimized both for the treatment of effluents concentrated in $H_2S$ or, on the contrary, highly diluted.

The method thus combines the advantage of the selective oxidizing of $H_2S$ with respect to other oxidizing approaches, namely including exothermic reactions, with stable operation, high selectivity in S (greater than 95%, preferably greater than 99%, and ideally 100%), a high conversion of $H_2S$ (greater than 95%, preferably greater than 99% and ideally 100%), and a negligible conversion of $CH_4$ and $CO_2$ (0%).

The method makes it possible to selectively remove $H_2S$ (production of S) in gaseous effluents without limitation of explosiveness because it is produced without direct contact with the oxygen, and, advantageously, to remove $H_2S$ substantially completely (greater than 99%, and ideally 100%).

In addition, this method makes it possible to treat complex effluents, in particular hydrocarbons or even biogas, without requiring prior separation of the hydrogen sulphide.

Periodic recycling of the solid reagent allows the reoxidizing of the material and thus the maintenance of performance.

The invention also relates to a method and an installation for substantially complete removal of hydrogen sulphide from different types of sources (effluents from desulphurization installations, biogas, etc.). By "substantially complete" or equivalent terms, it is understood to mean the removal of hydrogen sulphide so that it is only present in the effluent(s) likely to contain it, at a concentration that is lower than the standards and norms that are applicable according to the use.

Advantageously, as the solid is regenerated at each cycle, deactivation by sulfur is avoided. $H_2S$ and S are never in direct contact with the oxidizing agent, the solid reagent, typically $O_2$ (reagent), thus making it possible to limit the total oxidizing reaction of the sulfur in the first phase of the method and thus to optimize the selectivity.

Advantageously, according to one variant, the method and the installation according to the invention operates in the absence of oxygen gas during the reaction of $H_2S$ with the solid reagent. In addition to improving the selectivity, this system is no longer limited by the explosiveness of $H_2S/O_2$ mixtures, thus allowing the treatment of effluents highly concentrated in $H_2S$.

In addition, through the higher reactivity of $H_2S$ with respect to hydrocarbons (especially methane), the invention also relates to a method and a treatment installation for $H_2S$—$CH_4$ mixtures that do not require prior separation of the $H_2S$. This feature is interesting both for the treatment of hydrocarbons containing $H_2S$ but also for more complex mixtures such as biogas (typically $CH_4$—$CO_2$—$H_2S$).

According to one embodiment, at the envisaged reaction temperature, typically from 150° C. to 250° C., it is at the limit with respect to the sulfur dew point temperature (between 120° C. to 150° C.). It is therefore advantageously possible to collect the majority of the sulfur produced in a condenser downstream of the reactor.

According to one embodiment, the reactor(s) used for the oxidizing reaction of the $H_2S$ consist(s) of a fixed catalytic bed reactor traversed by a gas flow consisting of the mixture of hydrogen sulfide and possibly diluted oxygen. The oxidizing of hydrogen sulphide is advantageously carried out at a temperature ranging from 120° C. to 250° C., for example from 150° C. to 250° C., or from 120° C. to 200° C., and/or at atmospheric pressure (101325 Pa).

According to one embodiment, the oxidizing of the solid reagent is carried out at a temperature ranging from 150° C. to 250° C. and/or at atmospheric pressure (101325 Pa).

According to one embodiment, the oxidizing reaction of $H_2S$ is carried out by subjecting the solid reagent to repeated cycles of oxidizing-reduction by alternately exposing it to hydrogen sulfide and oxygen. In practice this is achieved by periodically supplying the fixed bed reactor.

This is the simplest method to achieve this type of reaction. Other variants exist, in particular, to improve the performance of the method on an industrial scale, for example by implementing circulating fluidized bed reactors in the installation or method of the invention. In this case, the solid reagent is conveyed between at least two separate reactors where it is exposed to each of the reagents independently. This type of installation and method also has the advantage of being able to optimize each of the reaction phases more efficiently leading, therefore, to even more efficient operation of the invention.

According to one variant, the installation (or method) of the invention comprises a first reactor forming a system for oxidizing hydrogen sulphide to sulfur and a second reactor forming a system for oxidizing the solid reagent, wherein the first reactor is supplied with a flow containing hydrogen sulphide and the first reactor forms a system for oxidizing hydrogen sulphide to sulfur, while the second reactor is supplied with a flow containing at least one oxidizing agent and the second reactor forms a oxidizing system of the solid reagent, wherein the solid reagent circulates in the reduced state of the first reactor to the second reactor, and in the oxidized state of the second reactor to the first reactor.

According to one variant, the installation (or method) of the invention comprises at least one oxidizing reactor (110) alternately forming a system for oxidizing the hydrogen sulphide to sulfur and forming an oxidizing system for the solid reagent, wherein the oxidizing reactor (110) is alternately fed by a flow (111) containing hydrogen sulphide when the reactor forms a system for oxidizing hydrogen sulphide to sulfur, and is fed by a flow (113) containing at least one oxidizing agent when the oxidizing reactor (110) forms an oxidizing system of the solid reagent, wherein the solid reagent is preferably immobilized in the oxidizing reactor (110).

According to one variant, the installation (or method) of the invention comprises at least two reactors (310, 410) wherein each alternately and inversely forms a system for oxidizing the hydrogen sulphide to sulfur and an oxidizing system of a solid reagent, wherein a first reactor (310) is alternately fed (i) with a flow containing hydrogen sulphide (311) when the reactor forms a system for oxidizing hydrogen sulphide to sulfur, or (ii) by a flow containing at least one oxidizing agent (313) when the first reactor (310) forms an oxidizing system of the solid reagent, and a second reactor (410) is alternately fed (i) with a flow containing hydrogen sulphide (311) when the second reactor (410) forms a system for oxidizing hydrogen sulfide to sulfur and when the first reactor (310) forms an oxidizing system for the solid reagent, or (ii) a flow containing at least an oxidizing agent (313) when the second reactor (410) forms a system for oxidizing the solid reagent and when the first reactor (310) forms a system for oxidizing hydrogen sulphide to sulfur, wherein the solid reagent is preferably immobilized in the first reactor (310) and the second reactor (410).

The invention relates to an installation implementing a method as defined according to any one of the variant embodiments, wherein preferred or advantageous aspects of the invention, including according to any one of their combinations.

The invention relates to a method of implementing an installation as defined according to any one of the embodiments, variants, preferred or advantageous aspects of the invention, including in any one of their combinations.

According to one variant, the concentration of $H_2S$ in the flow entering the oxidizing system of $H_2S$ is small, typically greater than 0% and less than or equal to 3%, or greater than 0% and less than or equal to 1%, or more than 0% and less than or equal to 0.5%. This may be the case, for example, in applications where the removal of $H_2S$ is in question. An excess amount of oxygen relative to stoichiometry may also be considered in order to ensure complete reoxidizing of the solid reagent and deposited sulfur.

According to one variant, the concentration of $H_2S$ in the flow entering the oxidizing system of $H_2S$ is greater than 3 and less than or equal to 4%.

According to one variant, the concentration of $H_2S$ in the flow entering the oxidizing system of $H_2S$ is greater than 4%.

According to one variant, the concentration of $H_2S$ in the flow entering the oxidizing system of $H_2S$ is less than 44%.

According to one variant, the concentration of $H_2S$ in the flow entering the oxidizing system of $H_2S$ is greater than 44%.

Advantageously, the amount of solid reagent is sufficient to oxidize the amount of $H_2S$ involved. The amount of $H_2S$ depends on the concentration of $H_2S$, the total flow rate of the flow containing $H_2S$, and the duration of the oxidizing of $H_2S$. (residence time in the oxidizing reactor). According to one variant, the number of moles of $H_2S$ is less than or equal to the number of moles of oxygen available for the oxidizing of $H_2S$. This number of moles of available oxygen depends on the nature of the solid reagent, in particular in the oxidized state. According to one variant, the number of moles of oxygen available, in the form of dioxygen, for the oxidizing of the solid reagent is at least equal to or greater than the number of moles of oxygen consumed during the oxidizing of $H_2S$ (or reduction of the solid reagent with $H_2S$).

Alternatively, the flow comprising hydrogen sulphide may have a hydrogen sulphide concentration whose stoichiometric conversion to sulfur and water would require a mixture comprising hydrogen sulphide and oxygen in the explosive range.

Advantageously, the oxidizing of hydrogen sulphide has a selectivity for the production of sulfur of greater than 90%, and preferably greater than 95%.

Advantageously, the oxidizing of hydrogen sulphide has a conversion to sulfur greater than 50%, and preferably greater than 80%, and even more preferably greater than 90%.

An advantage of the method according to the invention is that it is independent of the concentration of $H_2S$.

An advantage of the method according to the invention is that it may be implemented with an incoming flow containing, in addition to $H_2S$, other gases such as, for example, hydrocarbons (alkanes, alkenes, and especially methane, etc.) because it is implemented at a low temperature that does not oxidize these other gases under the oxidizing conditions of $H_2S$.

The principle of the invention advantageously consists in using a solid reagent with particular properties:
1. having oxygen storage and transfer capacity;
2. allowing the activation of hydrogen sulphide;
3. under the conditions of implementation, selectively leading to sulfur and water ($H_2S$+Sol-O→S+$H_2O$+Sol-R) and not to total oxidizing ($H_2S$+Sol-O→$SO_2$+$H_2O$+Sol-R) where (Sol-O and Sol-R represent the solid reagent in the oxidized and reduced state, respectively). The formation of by-products is thus advantageously limited. The formation of $SO_2$ is advantageously limited as far as possible but is not acceptable insofar as it is always more favorable to have $SO_2$ instead of $H_2S$ in the output flow.
4. The oxygen storage capacity is advantageously reconstituted by reoxidizing with $O_2$ (eq. 4).

The conditions 1 and 4 above are generally provided by a solid comprising at least one reducible oxide. The condition 2 above may be provided by the same oxide or by another solid phase associated with the first, for example a metal supporting, or supported by, the reducible oxide. Condition 3 above is determined by the nature of the oxide or all of the phases present in the solid reagent, as well as the operating conditions of oxidizing and reduction of the solid reagent.

The activity and the selectivity of the solid is ensured by the presence of a reducible oxide serving as oxygen vector and $H_2S$ activation at the same time.

Advantageously, the method of the invention is carried out over several repeated cycles of oxidizing the hydrogen sulfide and the solid reagent, for example over at least 5, 10, 20, 30, 40, 50, or 100 cycles. The solid reagent may be discharged and replaced with a new solid reagent if necessary in order to restart new oxidizing cycles.

Advantageously, the method and the installation according to the invention operate continuously, i.e. the production of sulfur is continuous from a continuous flow containing hydrogen sulphide.

Alternatively, the method and the installation according to the invention operate in a discontinuous or semi-continuous manner, i.e. the production of sulfur is discontinuous or semi-continuous from a discontinuous or semi-continuous flow containing hydrogen sulphide.

The invention therefore relates, in another aspect, to a solid reagent (which may also be called a catalyst) having the following chemical formula and its use as a solid reagent, especially in the installation and/or the method according to the invention:

El1-Ox1 where El1 comprises or consists of one of the following elements taken alone or in any of their combinations and selected from among: Bi, Co, Cu, Fe, Ir, Mo, Pb, Pd, Re, Rh, Ru, Sb, V and oxides and hydroxides comprising one or more of these elements; wherein Ox1 comprises or consists of one of the following elements taken alone or in combination and selected from among: Al, Ce, Ti, Mg, Si, Ta and their oxides;

The solid reagent may contain hydroxides in the initial state. The hydroxides will then be converted into oxides during oxidizing of the solid reagent.

According to a specific embodiment, Ox1 comprises or consists of one of the following elements taken alone or according to any one of their combinations and chosen from among: $Al_2O_3$, $CeO_2$, $TiO_2$, MgO, $SiO_2$ and $Ta_2O_5$.

According to a specific embodiment, El1 comprises or consists of one of the following elements taken separately or according to any one of their combinations and chosen from among: V, Cu, Mo and Pb.

According to a specific embodiment, El1 comprises or consists of an oxide of El1 supported on a titanium dioxide, and, in particular, a vanadium oxide supported on a titanium dioxide.

The supported V-based solid reagents are well known for the partial oxidizing of hydrogen sulfide in conventional (co-fed) reactors, so they have interesting $H_2S$ activation properties.

The invention particularly relates to a solid reagent based vanadium oxide particles ($V_2O_5$), in particular supported on titanium dioxide ($TiO_2$). Advantageously, the support acts essentially as inert phase in this reaction and at the same time promotes the dispersion of $V_2O_5$. The latter advantageously acts as oxygen carrier by oxidizing and reduction under $O_2$ and $H_2S$ respectively. It advantageously allows the good activation of hydrogen sulfide and thus high conversions. Under these conditions, the selectivity during the oxidizing of $H_2S$ is excellent whereas at a higher reaction temperature (for example at 250° C.), these same elements lead to a significant production of $SO_2$ under the same operating conditions.

Preferably, the solid reagent has a ratio El1/(El1+Ox1) by weight ranging from 0.005 to 1.

Advantageously, the solid reagent is supported on $TiO_2$ (V/$TiO_2$), preferably with a ratio V/(V+$TiO_2$) ranging from 0.005 to 1, and preferably 0.0077.

The amount of $V_2O_5$ is preferably sufficient to convert at least 90% and preferably at least 99% of hydrogen sulfide. The amount of $V_2O_5$ is, for example, 1.5 or 3 times higher (in moles) than the amount of $H_2S$ treated per cycle.

The present invention is also illustrated by the embodiments according to the figures described below:

FIG. 1 schematically shows a variant of an installation and a method according to the present invention. According to FIG. 1, the solid reagent circulates between two reactors, namely the hydrogen sulfide oxidizing reactor 10 and the solid reagent oxidizing reactor 20. Advantageously, the method according to FIG. 1 operates continuously. The reactors 10 and 20 are typically of the fluidized type. According to FIG. 1, a hydrogen sulfide oxidizing system comprises a hydrogen sulfide oxidizing reactor 10 which comprises an inlet duct 11 of a gaseous flow comprising hydrogen sulphide, optionally in a mixture with other gases such as methane, carbon dioxide, dinitrogen and any of their mixtures. The oxidizing reactor 10 comprises an oxidizing gas outlet duct comprising sulfur, water, a reduced solid, resulting from the oxidizing reaction carried out in the oxidizing reactor 10, and possibly other gases such as methane, carbon dioxide, dinitrogen, etc. and any of their mixtures. According to one embodiment, the solid reagent is injected at the inlet of the hydrogen sulfide oxidizing reactor with a gas flow containing hydrogen sulphide and, optionally, other gaseous compounds such as methane, carbon dioxide, dinitrogen, etc., and any of their mixtures. At the outlet of the oxidizing reactor 10, the solid reagent is in the reduced state and is contained in the outlet flow 15 which is advantageously supplied to a device 40 for separating the solid reagent from the gas containing the sulfur and the water vapor as well as any other gaseous constituents possibly present. The reduced-state solid reagent is injected via the duct 21 into a solid reagent oxidizing reactor. The reduced-state solid reagent is oxidized in the oxidizing reactor by means of an oxidizing agent, typically oxygen, optionally in the presence of other gases such as, for example, dinitrogen, argon, helium, etc. and any of their mixtures, preferably in counter-current flow to the oxidizing reactor 20 via a duct 23. The outlet line 25 of the flow comprising the oxidizing agent has a low concentration of oxidizing agent following its consumption in the oxidizing reactor 20. The device can provide recycling of the oxidizing agent of the outlet duct 25 to the inlet duct 23. Advantageously, the oxidized solid reagent is collected at the outlet of the oxidizing reactor 20 and circulates in the duct 13 connecting the solid reagent oxidizing reactor to the hydrogen sulfide oxidizing reactor. The flow containing the sulfur, the water vapor, and possibly the other gaseous compounds from the separation of the outlet flow of the duct 15 may be sent to a condenser 30 via the duct 31. The latter can separate the elemental sulfur recovered in a duct 35 from the rest of the gas flow, for example that recovered in a duct 37.

Figure 2:
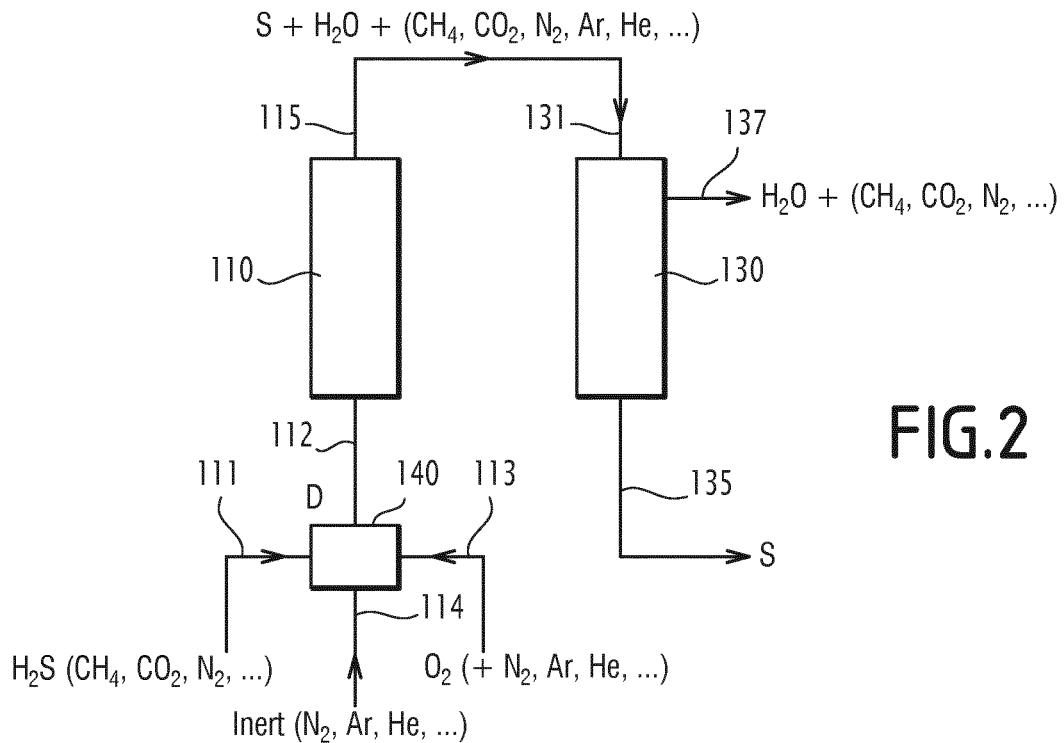
FIG. 2. Schematic diagram of a second variant installation and a flow scheme outlining a method of treating a flow comprising hydrogen sulfide.
Figure 3:
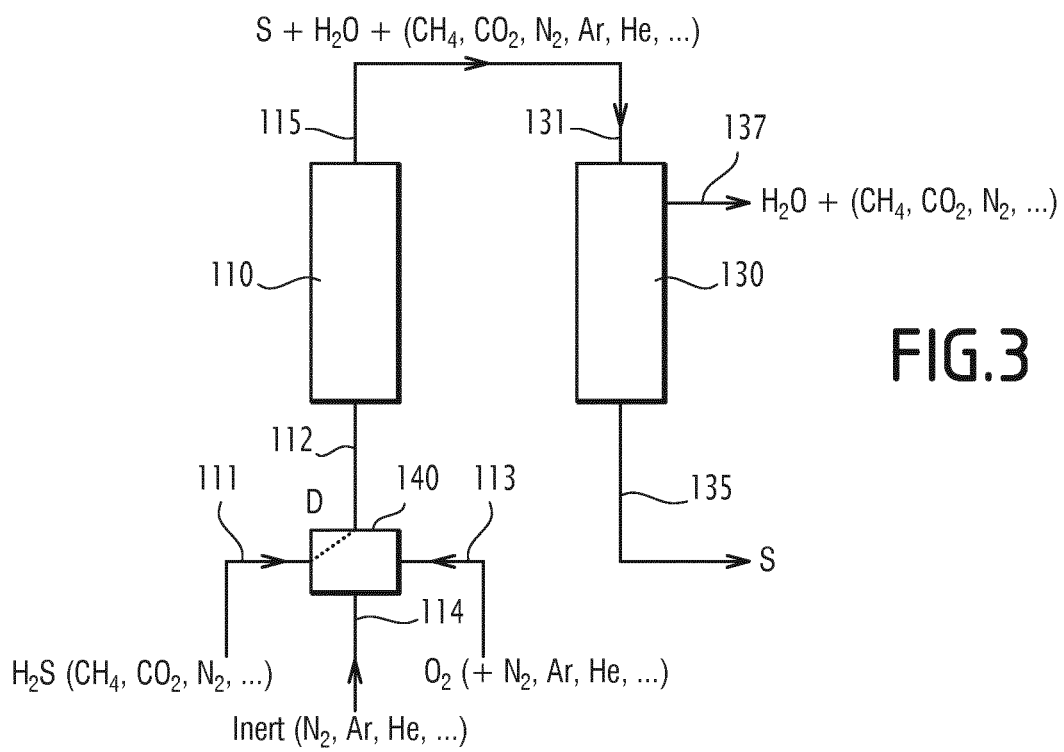
FIG. 3. Flow scheme illustrating a first position of the switching device, wherein the flow containing hydrogen sulphide is not brought into contact with the oxidizing agent.
Figure 4:
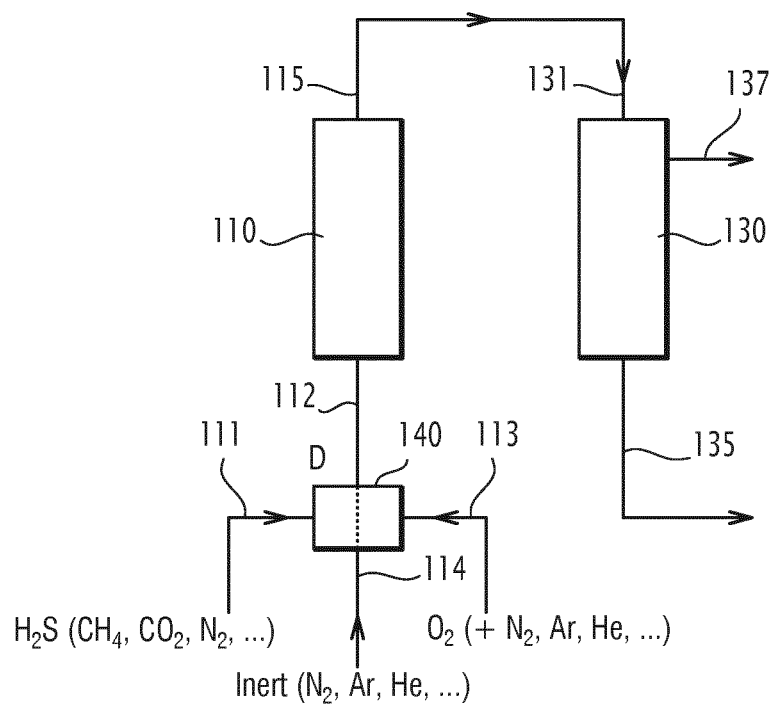
FIG. 4. Flow scheme illustrating a second position of the switching device showing that the flow of inert gas in the installation makes it possible to purge the ducts and reactor (s).
Figure 5:
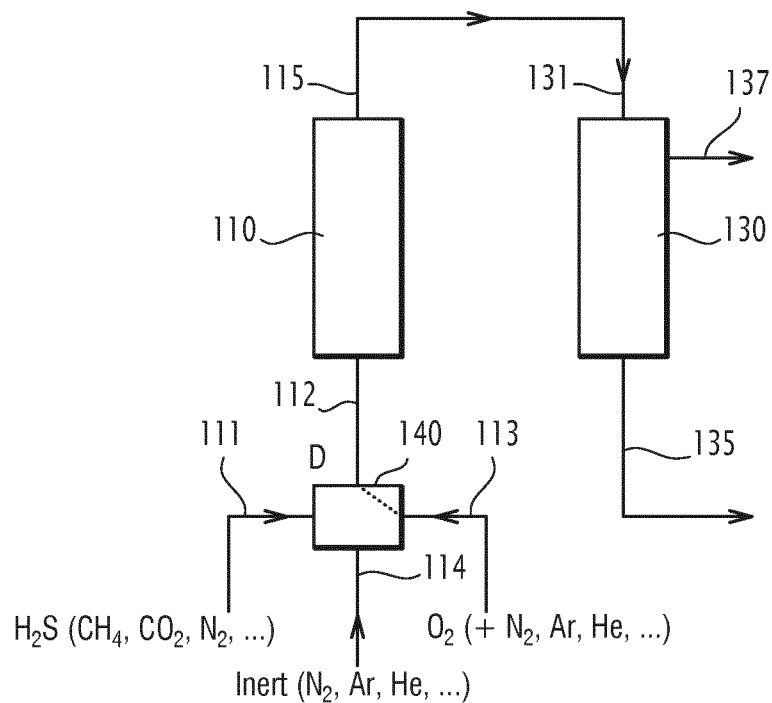
FIG. 5. Flow scheme illustrating a third position of the switching device showing that allows circulation of the flow containing the oxidizing agent, functioning as an oxidizing reactor for the solid reagent.

FIG. 2 represents a schematic view of a variant of an installation and a method according to the present invention. According to FIG. 2, the installation and the method comprise a periodic feed reactor. According to FIG. 2, the solid reagent is advantageously immobilized in an oxidizing reactor 110. It may typically be a fixed bed reactor. The references of FIG. 2 correspond to the references of FIG. 1 to which one hundred has been added, with the exception of the modifications related to the difference in the installation and implementation of the method. In particular, at the inlet of the oxidizing reactor 110, the device and the method comprise a duct 111 bringing a gas flow comprising hydrogen sulphide and optionally the other gases present such as those mentioned above in communication with a device 140 for switching the flow of hydrogen. gas. The device 140 for switching the gas flows also comprises an inlet duct 114 for inert gas(es) such as, for example, nitrogen, argon, helium, etc., forming purge gas for the oxidizing reactor 110. The switching device 140 also comprises an inlet duct 113 comprising at least one oxidizing agent such as oxygen, and optionally other neutral gases such as those mentioned above. FIGS. 3 to 5 show the three operating modes of an installation and method according to FIG. 2.

According to FIG. 3, the switching device 140 allows the circulation of the flow containing the hydrogen sulphide brought by the duct 111 to the duct 112 in communication with the oxidizing reactor 110. The hydrogen sulphide entering the oxidizing reactor 110 is oxidized in the presence of the solid reagent in particular sulfur and water. Thus, the oxidizing reactor 110 forms an oxidizing system for hydrogen sulphide. The flow containing the hydrogen sulfide flows from the oxidizing reactor 110 to the condenser 130 through the ducts 115 and 131 and may form one and the same flow duct of the gas flow containing sulfur and water. The condenser 130 allows separation of the sulfur and its discharge via a duct 135 from the gas flow comprising water and any other gases present, and their discharge via the duct 137. According to the operation illustrated in FIG. 3, the flow containing the hydrogen sulphide is not brought into contact with the oxidizing agent.

FIG. 4 illustrates a second position of the device 140 for switching of the gas flow and subsequent to the first position illustrated in FIG. 3. In this second position illustrated in FIG. 4, the flow of inert gas is introduced via the circulation duct 112 into the oxidizing reactor 110, then flows through the ducts 115 and 131 to the condenser 130. The inert gas makes it possible to avoid the formation of potentially dangerous mixtures in contact with the hydrogen sulphide and the oxidizing agent (dioxygen). Thus, the flow of inert gas in the installation makes it possible to purge the ducts and reactor(s).

FIG. 5 illustrates a third position of the device 140 for switching of the gas flow and subsequent to the second position illustrated in FIG. 4. According to FIG. 5, the device 140 for switching the gas flow allows the circulation of the flow containing the oxidizing agent, preferably oxygen, optionally in the presence of other gases such as inert gases from duct 113 to duct 112 in communication with the oxidizing reactor 110, this time functioning as an oxidizing reactor for the solid reagent present in the reduced state in the reactor 110. A flow of oxidizing agent depleted gas then flows through the discharge ducts 115 and 131. Optionally, a method and an installation variant of FIG. 5 may provide for the discharge of the depleted oxidizing agent gas not entering the condenser 130. This would limit the volume of the duct and the device to be purged by the inert gas. This embodiment is not illustrated in FIG. 5.

Thus, the device according to FIG. 2 may operate successively and preferably repeatedly to feed the oxidizing reactor 110 with the following flows:

according to FIG. 3 with a gas flow containing hydrogen sulfide and, optionally, other gaseous compounds;
according to FIG. 4 with a flow of inert gas;
according to FIG. 5 with a gas flow containing an oxidizing agent.

The switching device 140 may consist of one or more elements such as, for example, connection valves, etc.

According to FIG. 2, the oxidizing reactor 110 functions as a system for oxidizing hydrogen sulphide to sulfur and water (FIG. 3) or as an oxidizing system for the solid reagent (FIG. 5).

Figure 6:
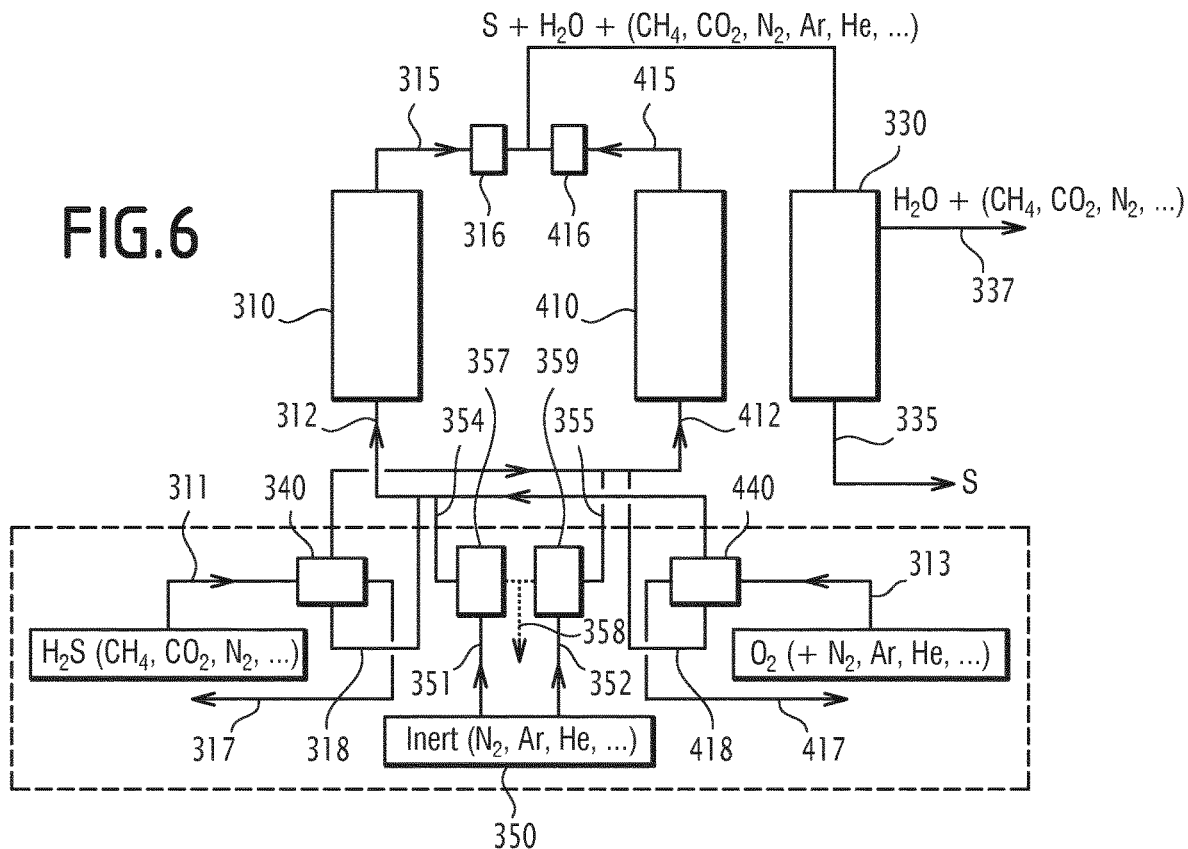
FIG. 6. Schematic representation of a combination of periodically fed reactors.

FIG. 6 shows schematically a combination of periodically fed reactors. Advantageously, according to FIG. 6, the solid reagent is immobilized in several reactors 310, 410, for example fixed-bed reactors.

A device for switching the gas flows 340, 440 makes it possible to feed each reactor advantageously and successively and preferably repeatedly with the three gaseous flows mentioned in the method and the installation according to FIG. 2.

The combination of at least two reactors 310, 410 makes it possible to inject a reactive flow containing hydrogen sulphide into a reactor, for example 310, while the flow of oxidizing agent is injected into the other reactor, for example 410. A neutral or inert gas flow ensures purging between the passages of the reactive flows in each reactor 310, 410. FIG. 6 illustrates an example with two reactors. The invention covers more than two reactors so used. The devices for switching the gases 340 and 440 between the three sources ($H_2S$, $O_2$ and inert) make it possible to direct the flows to the respective reactors 310, 410 or possibly to a recycling of the gas. The switching devices 340 and 440 may consist of one or a plurality of valves operating in a coordinated manner. The invention moreover comprises, more generally, a computer control device for the installation and/or the method according to the invention, and, in particular, the switching devices mentioned with reference to the figures.

Figure 7:
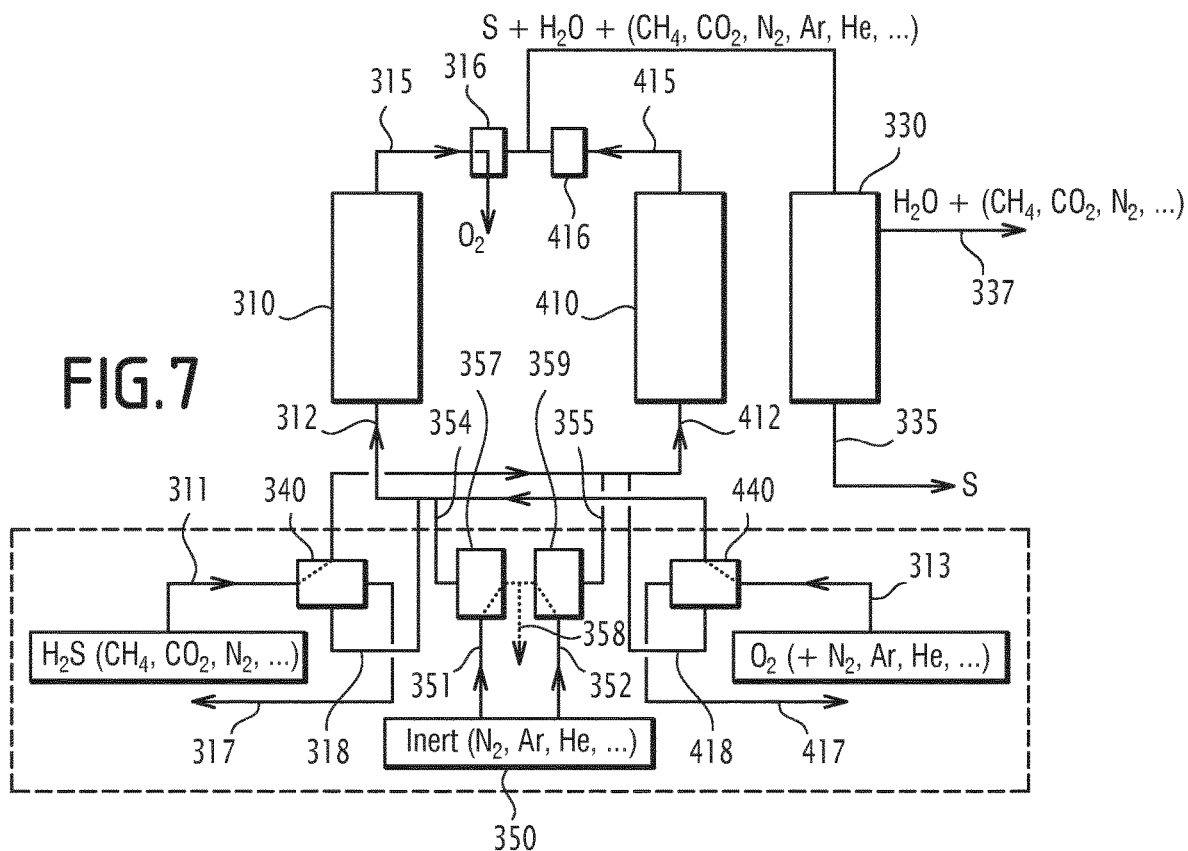
FIG. 7. A first operating mode of an installation.
Figure 8:
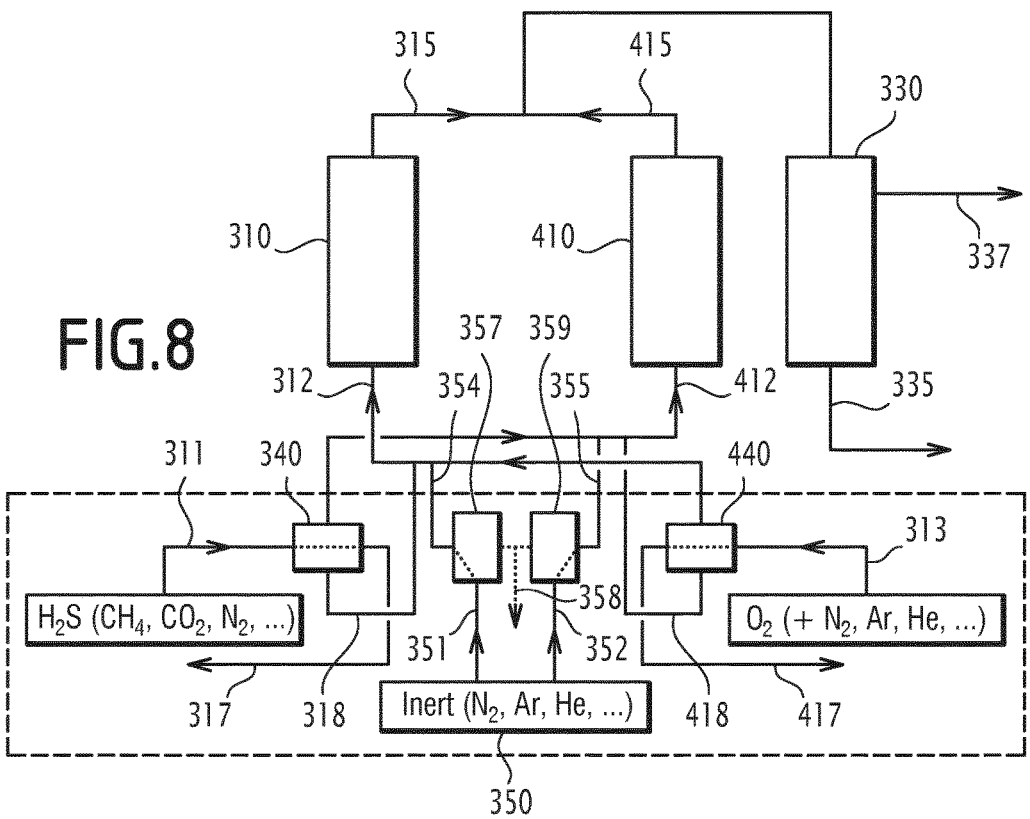
FIG. 8. A second operating mode of an installation.
Figure 9:
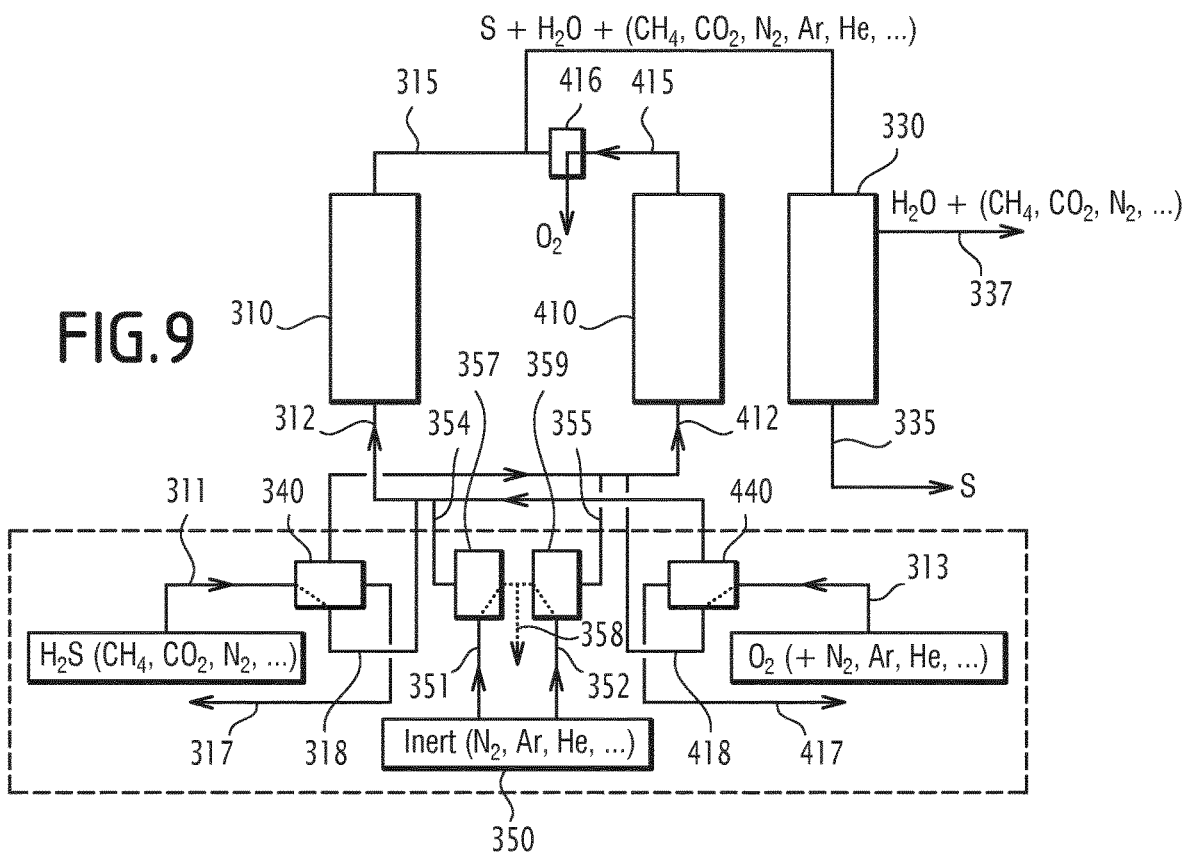
FIG. 9. A third operating mode of an installation.

FIGS. 7 to 9 illustrate the different operating modes of an installation and a method according to FIG. 6.

According to FIG. 7, the flow 311 containing the hydrogen sulphide is injected via the duct 412 into the oxidizing reactor 410, wherein the switching device 340 allows communication between the ducts 311 and 412. The oxidizing reactor 410 operates as an oxidizing system for hydrogen sulphide in the presence of the oxidized solid reagent which is reduced as the progress of the oxidizing of hydrogen sulphide continues. The outlet duct 415 brings a flow containing sulfur and water and any other gases contained in the flow entering the duct 311. The duct 415 is in communication with a condenser 330 allowing separation of the sulfur recovered in the duct 335 of the gas flow discharged via line 337, and containing the steam and any other gases present. The flow containing the oxidizing agent (oxygen here) and optionally other inert gases is fed through the duct 313 via the switching device 440 allowing communication of the duct 313 with the duct 312 in communication with the oxidizing reactor 310 and the solid reagent present in the reduced state. The oxidizing reactor 310 functions as a system for oxidizing the solid reagent in the reduced state, in particular to regenerate it for a subsequent hydrogen sulfide oxidizing reaction. According to one variant, the duct 315 comprises a device for switching the gas flow 316 allowing the discharge of the oxidizing agent before it comes into contact with the duct 415, which contains sulfur and water. This switching valve 316 is optional. In fact the outflow of the oxidizing reactor 310 may contain a low oxygen concentration which may be desirable in order to avoid contact with the flow 415 containing sulfur and water. According to this embodiment, the flow of inert gas from a reservoir 350 circulates in the ducts 351 and 352, typically in a closed loop and does not communicate with the oxidizing reservoirs 310 and 410. It may be discharged via a duct 358 functioning as a circulation loop returning the gas to the reservoir 350.

According to FIG. 8, the method and the installation operate in the purge mode of the reactors 310 and 410. Thus, the flow containing the hydrogen sulphide is stopped or recycled and the flow containing the oxidizing agent is stopped or recycled. The flow of inert gas is sent to the reactors 310 and 410. Thus, the switching device 340 allows the flow of the inlet duct 311 containing the hydrogen sulphide to the outlet duct 317, while the switching device 440 allows communication between the inlet duct 313 containing the oxidizing agent and the outlet duct 417. The switching devices 357 and 359 allow the communication of the ducts 351 and 354, on the one hand, and the ducts 352 and 355, on the other hand, for supplying the inert gas respectively to the oxidizing reactors 310 and 410 by purging the ducts 312 and 412. Alternatively, there may be a small flow of inert gas during operation according to FIG. 7 to isolate any contact with residual oxygen in duct 312 or duct 412. According to this embodiment, the switching devices 340 and 440 are positioned according to FIG. 7 while the switching devices 357 and 359 are positioned according to FIG. 8.

According to FIG. 9, the flow containing the hydrogen sulphide is injected into the reactor 310 functioning as a hydrogen sulphide oxidizing system. The flow containing the oxidizing agent injected into the reactor 410 functions as the oxidizing system of the solid reagent present in the reduced state. The flow of inert gas is usually returned to recycling or stopped. Optionally, according to one embodiment, an inert gas flow makes it possible to ensure complete sealing with any residual oxidizing agent present in the ducts 312 and 412. According to FIG. 9, the switching device 340 authorizes communication of the duct 311 causing the flow containing the hydrogen sulfide, and the duct 312 in communication with the oxidizing reactor 310. The oxidizing reaction of the hydrogen sulfide in the presence of the solid reagent present in the oxidized state is carried out in the reactor 310, then the oxidized flow containing the sulfur, the water and any other gases present, is discharged via the duct 315 in communication with the condenser 330 for the separation of the sulfur by the duct 335 from the steam and the other residual gases discharged by the duct 337. The switching device 340 allows communication between the duct 313 input flow containing the oxidizing agent and the duct 412 in communication with the oxidizing reactor 410, which functions as an oxidizing system of the solid reagent present in the reduced state, thus advantageously to regenerate it for a subsequent reaction of oxidizing of hydrogen sulfide. The flow depleted of oxygen may be discharged via duct 415. Preferably, the installation and the method comprise a switching device 416 diverting the flow containing the oxidizing agent, even if it is depleted, from communication with duct 315. In the examples, the outflows of the reactors are mixed and treated together and it may be intended to treat the effluents of each isolated factor.

Other objects, features and advantages of the invention will become apparent to those skilled in the art following the reading of the explanatory description which refers to examples which are given solely by way of illustration and which in no way limit the scope of the invention.

The examples are an integral part of the present invention and any features appearing novel from any prior art from the description as a whole, including the examples, form an integral part of the invention in its function and its general scope.

Thus, each example has a general scope.

On the other hand, in the examples, the concentrations of the solids are given in percentages by weight, unless otherwise indicated, while the concentrations of the gases are given in percentages by volume, unless otherwise indicated, the temperature is the ambient temperature (25° C.) and is expressed in degrees Celsius, unless otherwise indicated, and the pressure is atmospheric pressure (101325 Pa) unless otherwise indicated.

EXAMPLES

The invention was implemented with solid reagents manufactured in the laboratory. The behavior of the V-based solid reagent supported on $TiO_2$ was verified using a commercial support (Aldrich).

$TiO_2$ (99.8% anatase, Sigma Aldrich) was washed for one hour with distilled water with stirring at room temperature. After centrifugation, the $TiO_2$ and the washings were separated and the $TiO_2$ was recovered. This operation was repeated 3 times. The washed $TiO_2$ was dried first in air and then in an oven overnight at 100° C. Finally, it was calcined under air at 450° C. for 4 h with a ramp of 5° C. min-1.

Vanadium is deposited by impregnation from ammonium metavanadate ($NH_4VO_3$). 90.04 mg of the $NH_4VO_3$ precursor (99%, Sigma Aldrich) was introduced into 20 ml of 1M oxalic acid. The mixture was heated with stirring at 100° C. Then, 5 g of previously washed and calcined $TiO_2$ was added to the solution, and then the mixture was kept at 100° C. while stirring until the solvent had completely evaporated. Finally, the mixture was dried in an oven overnight, then calcined in air at 450° C. for 4 h, with a ramp of 5° C. min-1.

The solid thus obtained has a mass fraction $V/(V+TiO_2)$= 0.0077 or 0.77%.

The following tables present some representative results. There are reported:

In Table 1: the nature of the solid used (the nature of the metal, the mass content of metal) as well as the reaction conditions (the amount of solid reagent used, the reaction temperature, the concentrations of hydrogen sulphide and oxygen used in percentages by volume, the total flow of incoming gas, the conditions of periodic operation (cycle times).

The tests were carried out in an installation as shown diagrammatically in FIGS. 2, 3, 4 and 5. The gas flow rates were established in order to feed the oxidizing reactor (110) with a constant flow rate at the inlet (112). The gases produced at the output of the installation (137) were analyzed using an on-line mass spectrometry analyzer of the Pfeiffer Omnistar® type.

Table 2 represents the results obtained under the conditions of the examples of Table 1 during exposure to $H_2S$. The conversion of hydrogen sulphide and the selectivity towards S were, in particular, measured.

The selectivity of S is very high (greater than 99% and close to 100%, except Example 4) with the absence of measurable $SO_2$ output. A lower value is indicative of $SO_2$ formation.

Examples 5 and 6 are composed of 30 complete cycles and show excellent stability of the behavior of the solids. In this case, the values indicated are averages integrated over the last 6 cycles carried out.

These results show that under very wide operating conditions both in terms of temperature and quantities of the solid, the performances of the system are close to the ideal in terms of reactivity.

The examples support the robustness of the method according to the invention when the above conditions are met, but also its adaptability to very variable operating conditions. They also demonstrate a great leeway for optimization, in particular by:

The control of the quantity and nature of the active or even multi-metallic phase by combining several elements in order to optimize the method of activation of $H_2S$ and selectivity towards sulfur and water;

The control of the oxygen supply from the oxide or support by changing its nature (oxides, mixed oxides, doped oxides);

The control of the total oxidizing of the catalyst and the sulfur thanks to the contribution of oxygen in the second phase of the method.

TABLE 1

| Ex. No | Metal (% by weight) | $m_{sol}$ (g) | $nV_2O_5/nH_2S$ (molar ratio) | T (° C.) | Concentrations of reagents (vol %) | Cycles (number) | Inlet flow (cc/min) | cycle |
|---|---|---|---|---|---|---|---|---|
| 1 | 0.77 | 0.4 | 3 | 150 | 0.2% $H_2S$ – 0.1% $O_2$ | 3 | 100 | 1 min. $H_2S$ – 1 min. $O_2$ |
| 2 | 0.77 | 0.1 | 0.75 | 150 | 0.2% $H_2S$ – 0.5% $O_2$ | 4 | 100 | 1 min. $H_2S$ – 1 min. $O_2$ |
| 3 | 0.77 | 0.2 | 1.5 | 150 | 0.2% $H_2S$ + 20% $CH_4$ – 0.5% $O_2$ | 2 | 100 | 1 min. $H_2S$ + $CH_4$ – 1 min. $O_2$ |
| 4 | 0.77 | 0.2 | 1.5 | 250 | 0.2% $H_2S$ + 20% $CH_4$ – 0.5% $O_2$ | 2 | 100 | 1 min. $H_2S$ + $CH_4$ – 1 min. $O_2$ |
| 5 | 0.77 | 0.4 | 3 | 150 | 0.2% $H_2S$ + 20% $CH_4$ – 0.5% $O_2$ | 30 | 100 | 1 min. $H_2S$ + $CH_4$ – 1 min. $O_2$ |
| 6 | 0.77 | 0.4 | 3 | 150 | 0.2% $H_2S$ + 20% $CH_4$ + 10% $CO_2$ – 0.5% $O_2$ | 30 | 100 | 1 min. $H_2S$ + $CH_4$ + $CO_2$ – 1 min. $O_2$ |

$m_{so}$ is the mass of solid reagent
cc/min is cubic centimeters per minute

TABLE 2

| Example No | Conversion $H_2S$ (%) ± 1 | Selectivity S (%) ± 1 | Conversion $CH_4$ (%) ± 1 | Conversion $CO_2$ (%) ± 1 | Conversion $O_2$ (%) ± 1 |
|---|---|---|---|---|---|
| 1 | 100 | 100 | — | — | 100 |
| 2 | 60-70 | 100 | — | — | 5-10 |
| 3 | 90-95 | 100 | 0 | — | 20-30 |
| 4 | 95-100 | 85-90 | 0 | — | 20-25 |
| 5 | 100 | 100 | 0 | — | 20-30 |
| 6 | 100 | 100 | 0 | 0 | 20-30 |

The conversion of $H_2S$ is very high (greater than 99% and close to 100% in Examples Nos. 1 and 4 to 6). The conversion to oxygen is lower because, in the examples (except No. 1), the tests were carried out with an excess of oxygen.

In the more specific context of the use of biogas, this method is particularly advantageous because the $H_2S$ impurity is removed without converting either $CH_4$ or $CO_2$.

The invention claimed is:

1. A hydrogen sulfide treatment installation, wherein the installation comprises at least one system configured to oxidize hydrogen sulfide to sulfur (S) to water ($H_2O$) by a solid reagent implementing the reaction $H_2S$+sol-O→sol-R+$H_2O$+S, wherein sol-O and sol-R respectively symbolize constituents of the solid reagent in oxidized and reduced forms, and at least one oxidizing system with an oxidizing agent of the solid reagent present in the reduced state, wherein the system oxidizing the hydrogen sulfide and the system oxidizing the solid reagent are so arranged that hydrogen sulfide is not brought into contact with the agent oxidizing the solid reagent, wherein said installation comprises a supply duct for a flow comprising hydrogen sulfide to said hydrogen sulfide oxidizing system and a duct for discharge of a flow comprising sulfur.

2. The installation according to claim 1 comprising downstream of the system oxidizing the hydrogen sulfide in gaseous sulfur, a sulfur separator of the flow initially comprising sulfur.

3. The installation according to claim 2, wherein the separator is configured to condense sulfur in liquid or solid form.

4. The installation according to claim 1, wherein the installation comprises one or more switch(es) configured to switch between the inlet of the hydrogen sulfide in the system oxidizing the hydrogen sulfide to sulfur and the inlet of the agent oxidizing the solid reagent to the system oxidizing the solid reagent.

5. The installation according to claim 1, wherein the system of oxidizing the hydrogen sulfide to sulfur comprises a reactor oxidizing the hydrogen sulfide in the presence of a solid reagent present in the oxidized state.

6. The installation according to claim 1, wherein the system oxidizing the solid reagent comprises a supply of at least one oxidizing agent in gaseous form.

7. The installation according to claim 6, wherein the at least one oxidizing agent is oxygen.

8. The installation according to claim 1 comprising a loop configured to recycle the solid reagent, wherein the loop comprises an oxidizing system of the solid reagent present in the reduced state in the presence of an oxidizing agent and a system for reducing the solid reagent present in the oxidized state, wherein the system for reducing the solid reagent also forms the system oxidizing the hydrogen sulfide in the presence of a solid reagent present in the oxidized state.

9. The installation according to claim 1, wherein the solid reagent has the following chemical formula:

$$El1\text{-}Ox1$$

where El1 comprises one of the following elements taken alone or in any of their combinations and selected from the group consisting of: Bi, Co, Cu, Fe, Ir, Mo, Pb, Pd, Re, Rh, Ru, Sb, V and an oxide comprising one or more of these elements;

wherein Ox1 comprises one of the following elements taken alone or in combination and selected from the group consisting of: Al, Ce, Ti, Mg, Si, Ta and their oxides.

10. The installation according to claim 1, wherein the flow comprising hydrogen sulfide comprises a hydrocarbon and/or carbon monoxide and/or dioxide, optionally in the presence of an inert gas.

11. The installation according to claim 10, wherein the hydrocarbon is methane.

12. The installation according to claim 10, wherein the inert gas is dinitrogen.

13. The installation according to claim 1 comprising a first reactor forming a system oxidizing the hydrogen sulfide to sulfur and a second reactor forming a system oxidizing the solid reagent, wherein the first reactor is supplied with a flow containing hydrogen sulfide, while the first reactor forms a system for oxidizing hydrogen sulfide to sulfur, and the second reactor is fed with a flow containing at least one oxidizing agent when the second reactor forms a system oxidizing the solid reagent, wherein the solid reagent circulating in the reduced state from the first reactor to the second reactor and, in the oxidized state of the second reactor, to the first reactor.

14. The installation according to claim 1 comprising at least one oxidizing reactor alternately forming a system oxidizing the hydrogen sulfide to sulfur and forming a system oxidizing the solid reagent, wherein the oxidizing reactor is alternately fed by a flow containing hydrogen sulfide when the reactor forms a system for oxidizing the hydrogen sulfide to sulfur, and is supplied with a flow containing at least one oxidizing agent when the oxidizing reactor forms a system oxidizing the solid reagent.

15. The installation according to claim 14, wherein the solid reagent is immobilized in the oxidizing reactor.

16. The installation according to claim 1 comprising at least two reactors, wherein each forms alternately and conversely a system of oxidizing the hydrogen sulfide to sulfur and a system of oxidizing the solid reagent, wherein a first reactor is alternately fed (i) with a flow containing hydrogen sulfide when the reactor forms a system for oxidizing the hydrogen sulfide to sulfur, or (ii) by a flow containing at least one oxidizing agent when the first reactor forms a system for oxidizing of the solid reagent, and wherein a second reactor is alternately fed (i) by a flow containing hydrogen sulfide when the second reactor forms a system for oxidizing the hydrogen sulfide to sulfur, and when the first reactor forms a system for oxidizing the solid reagent, or (ii) by a flow containing at least one oxidizing agent when the second reactor forms a system for oxidizing the solid reagent and when the first reactor forms a system for oxidizing the hydrogen sulfide to sulfur.

17. The installation according to claim 16, wherein the solid reagent is immobilized in the first reactor and the second reactor.

18. The hydrogen sulfide treatment installation according to claim 1, wherein the hydrogen sulfide and the sulfur are in gaseous form.

19. A method for treating at least one flow comprising hydrogen sulfide, wherein the method comprises a step of oxidizing the hydrogen sulfide to sulfur and water in the presence of a solid reagent in the oxidized state, and reducing during the oxidizing of the hydrogen sulfide, by implementing the reaction $H_2S+sol\text{-}O \rightarrow sol\text{-}R+H_2O+S$, wherein sol-O and sol R respectively symbolize constituents of the solid reagent in oxidized and reduced forms, and a step of oxidizing the solid reagent present in the reduced state by at least one oxidizing agent in order to obtain a solid reagent in the oxidized state, wherein the method comprises obtaining a flow comprising sulfur by oxidizing the hydrogen sulfide.

20. The method according to claim 19, wherein the oxidizing step of hydrogen sulfide is carried out in the absence of an agent for oxidizing the solid reagent.

21. The method according to claim 19, wherein the oxidizing of the hydrogen sulfide is carried out under conditions limiting the complete oxidizing of hydrogen sulfide to sulfur oxide.

22. The method according to claim 19, wherein the oxidizing of hydrogen sulfide is carried out at a temperature ranging from 120° C. to 250° C.

23. The method according to any claim 19, wherein the flow comprising hydrogen sulfide has a hydrogen sulfide concentration whose stoichiometric conversion to sulfur and water would require a mixture comprising hydrogen sulfide and oxygen in the explosive range.

24. The method according to claim 19, wherein the oxidizing of hydrogen sulfide has a selectivity for the production of sulfur greater than 90%.

25. The method according to claim 19, wherein the oxidizing of hydrogen sulfide has a conversion to sulfur greater than 50%.

26. The method of claim 19 wherein the step of oxidizing the hydrogen sulfide to sulfur and water in the presence of a solid reagent in the oxidized state, and reducing during the oxidizing of the hydrogen sulfide is repeated.

* * * * *